United States Patent [19]

Udwin et al.

[11] 4,083,703

[45] Apr. 11, 1978

[54] PROCESSING OF GAS STREAMS

[75] Inventors: Ellis G. Udwin, Long Beach, Calif.; Thomas R. Becker, Newport, Oreg.

[73] Assignee: Becker-Udwin, Inc., Portland, Oreg.

[21] Appl. No.: 383,525

[22] Filed: Jul. 30, 1973

[51] Int. Cl.² .............................................. B01D 47/04
[52] U.S. Cl. .............................................. 55/89; 55/90
[58] Field of Search .................. 55/89, 90, 233, 227, 55/228, 229, 242

[56] References Cited

U.S. PATENT DOCUMENTS

| 2,997,132 | 8/1961 | Allander et al. | 55/242 |
|---|---|---|---|
| 3,375,639 | 4/1968 | Miller et al. | 55/48 |
| 3,581,473 | 6/1971 | Rivie | 55/233 |
| 3,633,340 | 1/1972 | Illingworth | 55/90 |
| 3,698,554 | 10/1972 | Mail | 210/82 |
| 3,756,171 | 9/1973 | DeBord | 55/233 |

Primary Examiner—John Adee
Attorney, Agent, or Firm—Kolisch, Hartwell, Dickinson & Stuart

[57] ABSTRACT

Method and apparatus for removing material from a gas stream. The gas stream with entrained material is moved downwardly through a filter bed of loose filtering solids of not more than 1.4 millimeter size, simultaneously with the passage of liquid downwardly through the filter bed which wets the surfaces of the filtering solids. Backwashing at intervals cleans the surfaces of the filtering solids of material that has accumulated thereon.

8 Claims, 1 Drawing Figure

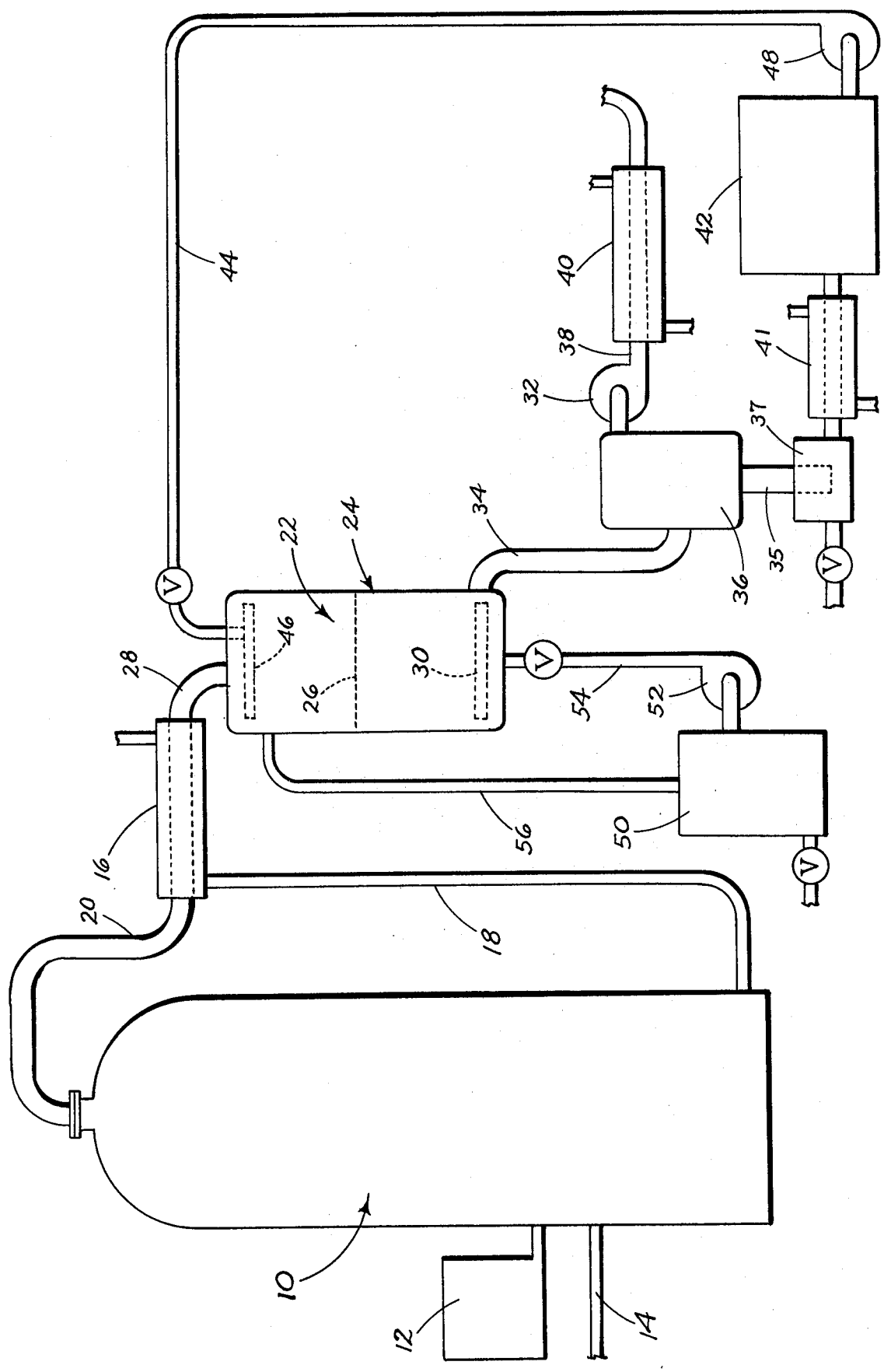

PROCESSING OF GAS STREAMS

This invention relates to a process and apparatus for removing material from a gas stream, and more particularly to a process and apparatus which relies upon concurrent flow of the gas stream and liquid through a filter bed to effect the removal of material.

While it is appreciated that the concepts of the invention have applicability to the treatment of a number of different types of gas streams, a particular application where the invention has demonstrated merit is in the treatment of flue gases, to eliminate particulate matter, opacity and odor prior to their being exhausted into the atmosphere. In this connection, the cleansing or purification of flue or stack gases currently is receiving much attention, with more and more concern being evidenced in the protection of the environment.

According to this invention, it has been discovered that exceptionally good results are obtained in the removing of material from a gas stream if the gas stream is directed downwardly through a filter bed made up of loose filtering solids, where the size of such solids is maintained below about 1.4 millimeters, and simultaneously with the passage of the gas stream through such bed liquid also is directed downwardly through the bed in concurrent flow with the gas stream. Because of the small size of the filtering solids, a very large surface area is presented by the solids in the filter bed which is wetted by the liquid. As the gas stream passes down through the bed and on being exposed to the wetted surfaces of the filtering solids, pollutants in the gas stream are removed through contact with these wetted surfaces. To maintain the efficiency of the system, the filter bed at intervals is backwashed with backwashing liquid to clean from the surfaces of the filtering solids accumulations of solid material removed from the gas stream. With water the usual backwashing liquid, it is also important that the filtering solids have a specific gravity exceeding that of water.

Thus, a general object of this invention is to provide improved apparatus and means for processing a gas stream to remove material carried in said stream.

A more specific object of the invention is to provide the above which makes use of a filter bed comprising a mass of loose filtering solids of small size, and wherein the gas stream and liquid are passed simultaneously in concurrent flow downwardly through the bed to effect removal of material by transfer from the gas stream to the wetted surfaces of these filtering solids.

Yet another object of the invention is provide a process particularly adapted to the removal of pollutants from flue or stack gases.

A still further object of the invention is to provide such a process, and apparatus for performing it, which enables the removal of pollutants from a flue gas and at the same time produces a marked reduction in temperature of gas through cooling of the gas processed. The above is of importance, for instance, in eliminating opacity from the gas when it is ejected into the atmosphere. Furthermore, heat extracted from the gas may be beneficially employed in the performance of other work operations.

These and other objects and advantages are attained by the invention which is described hereinbelow in conjunction with the accompanying drawing showing diagrammatically a form of apparatus for carrying out the invention.

As already indicated above, the invention contemplated has demonstrated utility in the processing of a flue gas, since through employing the invention a significantly greater amount of material carried in the gas classified as a pollutant may be removed from the gas than is possible using conventional prior art techniques.

Further explaining, incineration has been demonstrated to be an effective way to dispose of sewage sludge. The principal air pollutant emitted from a fluidized bed sewage sludge incinerator is inert particulate material. Under normal operating conditions, the average amount of particulate material carried in the flue gas from such an incinerator is in the order of 1.0 grains per dry standard cubic foot, at 12 percent $CO_2$. (A dry standard cubic foot is the equivalent of dry air at 70° F. and 29.92 inches of mercury barometric pressure.) A common air pollution emission standard may allow only 1.0 grains per dry standard cubic foot to be discharged from an incinerator, and regulations currently being contemplated may significantly reduce this figure. Using the invention, a flue gas from a sewage sludge incinerator has been processed to obtain a particulate emission rate of 0.02 grain/per dry standard cubic foot and lower.

The purification obtained by the invention is particularly significant when it is remembered that the particle size of the inert particulate material emanating from a sewage sludge incinerator is quite small, with ordinarily the major portion of such material having a particle size below 3 microns, and much of the material having a particle size of 0.1 micron and less.

Of primary importance in carrying out the invention is the utilization of a filter bed which employs as a filter media loose filtering solids of quite small size. Such solids, for instance, should not have a size exceeding 1.4 millimeters, and preferably should be within the range of 0.2 to 1.0 millimeters in size. With the use of such fine filtering solids, when the gas to be cleansed and liquid are passed downwardly through the filter bed, an extremely large wetted surface area is presented to the downwardly flowing gas which is effective to remove the particulates in the gas by having such transfer to the wetted surface area in the filter bed. In the case of particulate material that is not soluble in the liquid, the material over a period of time accumulates on the wetted surfaces of the filtering solids. It is felt that a factor in obtaining the excellent results that have been noted when practicing the invention is the Brownian movement that small particles possess when suspended in gas, and the tendency by reason of such movement for the particles to travel against the wetted surfaces of the filtering solids thence to be removed from the gas. The action of the filter bed, therefore, is significantly different from that of a bed comprised, for instance, of broken stone or gravel, where the broken stone functions primarily as a mixer for material passing through the bed.

Various forms of material may be used for the filtering media as contemplated by the invention. Illustrative of materials that may be employed are sand, glass beads, garnet particles, etc. Such materials are inert, and have a specific gravity substantially exceeding that of water, the usual backwashing liquid. Fine sand, for instance, has a specific gravity in the neighborhood of 2.3. In this connection, it is important that the solids have a specific gravity exceeding that of the backwashing liquid, preferably exceeding about 2.0, since the process of the invention requires backwashing of the filter bed at intervals to remove solid accumulations on the filtering solids, and such backwashing is most effectively done with material that can be placed in a fluidized state, in a manner which is controlled and without the loss of filtering media with the backwashing liquid.

Movement of the gas stream downwardly through the filter bed is produced by producing a pressure differential across the bed, as by employing a compressor on the upstream side or a vacuum producer on the downstream side of the filter bed. Apparatus constructed to handle the emissions from a sludge incinerator typically has employed a flow rate for the gas stream through the bed of from 25 to 100 cubic feet per minute, per square foot of cross-sectional area in the filter bed.

The amount of liquid needed for passage downwardly through the bed concurrently with the gas stream is not large. Typically a flow rate has been utilized ranging from about 0.5 to 2 gallons per minute per square foot of cross-sectional area in the filter bed. As already mentioned, the function of the liquid is to wet the surfaces of the filtering solids to provide a medium for the removal of the pollutants from the gas stream. If desired, coagulants may be included with the water to promote the coagulation of pollutant material and its deposit on the filtering solid's surfaces. Exemplary coagulants that may be utilized are such materials as aluminum sulphate, sodium aluminate, ferric chloride, and well-known proprietary polyelectrolytes such as Seperan marketed by Dow Chemical Corporation. In general, these materials promote polarization of particulate, whereby particules therein tend to adhere to each other thus to produce coagulation.

When backwashing the filter bed to remove from the filtering solids accumulations that have collected thereon, backwashing liquid such as water may be introduced to the base of the filter bed and passed upwardly therethrough, with a flow rate for the water selected sufficient to make a fluidized bed of the filtering solids. Thus, and when using sand and the like as the filtering media, a flow rate for the backwashing water of approximately 15 gallons per minute per square foot of cross-sectional area in the filter bed, is satisfactory, such a flow rate serving to produce a fluidized bed of the filtering solids without producing what may be thought of as an escape velocity in such solids, whereby such become entrained in the water to be carried out from the system. The backwashing period need not be very long, a backwashing period of from 3 to 8 minutes normally being sufficient. The water used in the backwashing may be recycled. The water may be stored in a storage facility, where settling of solids removed from the filter bed may take place.

The liquid used in the filtering of the gas stream also may be recycled. Since the gas stream being processed frequently may have a temperature well in excess of atmospheric temperature, the liquid used during the filtering is effective to cool such gas with the transfer of heat to the liquid. The liquid which is recycled may be passed through a heat exchanger, to enable the recovery of heat from and utilization of recovered heat in another plant operation.

Further to explain the invention, apparatus will be described as shown in the accompanying drawing of the type that might be employed in the processing of the stack or flue gas emanating from a fluidized bed sludge incinerator.

Referring to the drawing, the sludge incinerator itself is indicated generally at 10. Sewage sludge is fed to the incinerator by sludge feed 12. The incinerator is gas fired, and in the drawing the means for supplying fuel to the incinerator is depicted by gas feed 14. A heat exchanger is shown at 16 used in preheating the air supporting combustion within the incinerator, such air being supplied the incinerator through conduit 18. Flue gas emanating from the incinerator is carried to the heat exchanger by conduit 20.

The filtering unit employed to process the flue gas of the incinerator 10 is shown at 22. The unit comprises a substantially cylindrical upright filter housing 24 containing within it a mass of loose filtering solids shown packed within the filter housing to a level 26. Flue gas leaving heat exchanger 16 is introduced to the top of the filtering unit through conduit 28. Adjacent the base of the filter housing is what is referred to as a collector 30, which may take the form of connecting perforated pipes and the like, effective to collect liquid and gas passing down through the filter bed. The collector is constructed in such a manner as to inhibit the passage of the filtering solids into the collector.

Material leaving the filter housing collected by the collector travels through a conduit 34 to what is referred to as a separator 36. Liquid and gas are separated in the separator. Vacuum pump 32 with its intake end connected to the separator is effective to draw gas out from adjacent the top of the separator and to feed such gas through a conduit 38 to a heat exchanger 40, where the gas is expelled into the atmosphere. The vacuum pump produces a vacuum in separator 36, and through conduit 34 establishes a pressure differential across the filter bed within the filtering unit.

Liquid collecting at the base of the separator leaves the separator through a stand pipe 35 having its bottom end submerged in liquid contained within an open tank 37. The height of stand pipe 35 is sufficient to enable vacuum to be maintained within the separator, without atmospheric pressure exerted on the liquid contained in tank 37 causing such liquid to flow up the stand pipe into the separator. Liquid collecting in the separator leaves the separator through a heat exchanger 41, and thence travels into a storage facility 42.

Liquid introduced to the filtering unit during the filtering operation enters the filtering unit through conduit 44. The liquid is sprayed over the top of the filter bed through spray device 46. As an alternative construction, the liquid may be introduced into the gas stream prior to such entering the filtering unit, to be carried into the filtering unit with such gas stream. In the apparatus disclosed in the drawing, the liquid used during the filtering of te gas stream is recycled by pumping such from storage facility 42, and utilizing pump 48.

During backwashing of the filter bed in filtering unit 22, backwashing liquid contained in a storage facility 50 is pumped into the base of the filter housing 24 utilizing pump 52 and conduit 54. Backwashing liquid leaves the filter housing through a return conduit 56.

Describing the process of the instant invention as carried out in apparatus similar to that pictured in the drawing, in a pair of runs sewage sludge from a primary sewage treatment facility (referred to herein as primary sludge), and a digested sewage sludge (referred to herein as a digested sludge) was incinerated in a fluidized bed sludge incinerator. Bed temperatures in the incinerator ranged from 1100° to 1400° F. Exhaust or flue gas temperatures after the heat exchanger corresponding to exchanger 16 ranged between 530° and 660° F.

The flue gases were processed by directing them downwardly through a filtering unit 22 containing a filter bed having a cross-sectional area of 2.2 square feet, and a depth of 3 feet. The filtering media in the bed was ASTM No. 30 silica white sand (particle size 0.3 millimeters). The flow rate of the flue gas through the filtering unit in the case of the incinerated primary sludge was 32.8 standard cubic feet per minute per square foot of filter bed cross-sectional area, and in the case of the incinerated digested sludge was 28.8 standard cubic feet per minute per square foot of filter bed cross-sectional area. During the filtering, water was injected into the top of the filtering unit at the rate of from 3 to 4 gallons per minute. The initial pressure drop across the filter was approximately 1 pound per square inch.

Samples were collected upstream and downstream of the filtering unit for the purpose of determining the amount of particulate matter contained in the gas stream being processed. In the case of the incinerated primary sludge, the flue gas entering the filtering unit had a concentration of particulate matter of 0.367 grains per dry standard cubic foot. No measurable grain loading was observed downstream of the filtering unit. The flue gas produced with incineration of digested sludge was noted to have a concentration of particulate matter before the filtering unit of 0.217 grains per dry standard cubic foot. Again, no measurable grain loading was observed in the processed gas after the filtering unit. In both runs the temperature of the gas streams on leaving the filtering unit was in the range of 70° to 80° F.

In other runs, incincerated sludge was processed using a filter bed of 8 inch depth. The flue gas on leaving the filtering unit and separator 36 was visibly free of particulate matter.

Backwashing of the filter bed was done in all cases to remove particulate solids and restore filtering efficiency.

Further to illustrate the invention, in another run a burner was fired with diesel oil to produce a flue gas of considerable opacity. Microscopic examination of the flue gas showed the particulate material to be nearly all carbon particles. The smoke was introduced into a compressor, with the exhaust of such compressor delivering the gas to a filtering unit resembling filtering unit 22 described above. The filter media employed in the filtering unit was Del Monte sand No. 30, having a depth of approximately 2½ feet.

Determinations were made of the particulate loading of the gas entering the filtering unit and leaving the filtering unit. The gas entering the filtering unit had a grain loading of 0.1838 grains per standard cubic foot adjusted to 12 percent carbon dioxide. The loading of the gas leaving the filtering unit was noted to be 0.0158 grains.

A sample of dirty sand was removed from the filtering unit and rinsed with methanol, and a size distribution was determined of the particulate material in the rinsings. It showed a weight mean diameter of 10.3 microns, with a geometric deviation of 1.58.

The process of the invention has also been utilized in the treatment of flue gas emitted from the sulphite recovery system of a paper mill. A bed of approximately 28 inch depth was employed, and No. 30 ASTM sand was utilized in the bed. Approximately 70 cubic feet per minute per square foot of filter bed cross-sectional area was processed, and water flowed through the filter bed at the rate of 1 gallon per minute per square foot of filter bed cross-sectional area. Backwashing was performed at approximately 6 hour intervals, with each backwashing taking approximately 4 minutes. Backwashing was done with a flow rate of 15 gallons per minute per square foot of filter bed cross-sectional area. Untreated flue gas exhibited considerable opacity. Substantially all visible pollutants were removed by the filtering process. Gas entering the filtering unit showed a loading of particulate of 0.127 grains per standard cubic foot. Passage through the filtering unit produced removal of 97 percent of such material.

From the above, it should be obvious that apparatus and a process are contemplated capable of removing a significant amount of what are thought of as pollutants in flue gases. Grain loadings well within permissible standards can be obtained in exhausted gases which heretofore have not been obtained using conventional approaches.

It is claimed and desired to secure by Letters Patent:

1. A method of processing a gas stream to remove particles entrained therein comprising providing a bed of filter media comprising loose filtering solids of not more than about 1.4 millimeter size and having a specific gravity exceeding that of water, directing the gas stream downwardly through said bed, simultaneously with the passage of the gas stream through the bed passing liquid downwardly through the bed in concurrent flow with the gas stream thus to wet the filtering solids whereby the gas stream and entrained particles are exposed to wetted surfaces of the filtering solids on passage through the bed, the small size of the filtering solids promoting Brownian diffusion induced interception of the particles on the filter media, and at intervals backwashing the bed with liquid to clean from the surfaces of the filtering solids accumulations of particles removed from the gas stream.

2. The method of claim 1, wherein backwashing of the filter bed is done with liquid passed upwardly through said bed at a rate of flow producing a fluidized bed of said filtering solids.

3. The method of claim 1, wherein the liquid passed downwardly through the filter bed simultaneously with the gas stream is recycled.

4. The method of claim 1, wherein the gas stream being processed has a temperature elevated above atmospheric temperature, the liquid passed downwardly through the filter bed with the gas stream is recycled, and the recycled liquid is cooled in a region outside the filter bed.

5. The method of claim 4, wherein cooling is with heat exchange to a confined fluid mass.

6. The method of claim 1, which further comprises introducing a coagulant to the liquid which is passed downwardly through the bed.

7. In the processing of a gas stream to remove preferentially material carried in said stream, the processing comprising directing the gas stream downwardly through a filter bed, said filter bed comprising a packing of loose filtering solids of not more than about 1.4 millimeter size and having a specific gravity exceeding that of water, concurrently with the passage of the gas stream through the bed passing water downwardly trhugh te bed with such moving in concurrent flow through the bed with the gas stream and being effecitve to wet the filtering solids in said packing, removing said material from said stream by collecting such material on the wetted surfaces of said solids, the small size of the filtering solids promoting Brownian diffusion induced interception of the material on the filtering solids, and at intervals backwashing the bed with water to clean from the surfaces of the filtering solids accumulations of the material removed from the gas stream.

8. The process of claim 7, wherein backwashing of the bed is done with water directed upwardly through said bed with sufficient velocity to produce a fluidized bed of said filtering solids.

* * * * *